July 7, 1970 H. V. TYLER 3,519,849
RISE TIME/FALL TIME PULSE SENSOR
Filed May 15, 1967

INVENTOR.
HOWARD V. TYLER
BY
ATTORNEYS

United States Patent Office 3,519,849
Patented July 7, 1970

3,519,849
RISE TIME/FALL TIME PULSE SENSOR
Howard V. Tyler, San Diego, Calif., assignor to the United States of America as represented by the Secretary of the Navy
Filed May 15, 1967, Ser. No. 639,940
Int. Cl. H03k 5/20
U.S. Cl. 307—235                           3 Claims

ABSTRACT OF THE DISCLOSURE

A wave front, the rise time of which is to be measured, is applied to amplifiers A and B. The threshold bias of amplifier A is adjusted to produce a distinct trigger pulse when the wave front voltage rises to, say, 10% of maximum, which sets a flip-flop. The threshold bias of amplifier B is adjusted to produce a trigger pulse when the wave front voltage rises to, say, 90% of maximum, which resets the flip-flop. The duration of the flip-flop output pulse is a measure of the rise time of the wave front.

---

The invention described herein may be manufactured and used by or for the Government of the United States of America for governmental purposes without the payment of any royalties thereon or therefor.

Considerable effort has been made in designing automatic test equipment for monitoring complex electronic gear such as radar, radio, and computer equipments. At the various test points throughout the equipment, the common parameters to be measured are voltage, current, frequency and pulse duration. Much can be determined concerning the operation of the equipment from the rise time or steepness of the wave fronts moving through the equipment. The term "rise time" will be applied hereinafter to either positive going or negative going voltages, at either the leading or trailing edges of a pulse.

The object of this invention is to provide a simple means for accurately measuring the rise time of a wave front.

In attaining the object of this invention a single positive or negative pulse to be measured is linearly gated into the input of the circuits of this invention. The pulse of interest is applied to the input of amplifier A which produces a trigger voltage $\bar{A}$ when the pulse voltage rises to about 10% of the maximum amplitude of the input pulse. The same isolated pulse is also applied to the input of amplifier B which produces another trigger voltage when the pulse voltage rises to about 90% of the maximum amplitude of the input pulse. The two trigger voltages are applied, respectively, to the set and reset input terminals of a flip-flop. The resulting flip-flop output, $E_0$, consists of a single strong positive pulse whose duration is proportional to the time interval between the two trigger voltages and hence proportional to the rise time of the input wave front. By reversing the connections from the output terminals of the two amplifiers, A and B, to the set and reset terminals of the flip-flop, the fall time of the wave can be measured.

Figure 1:
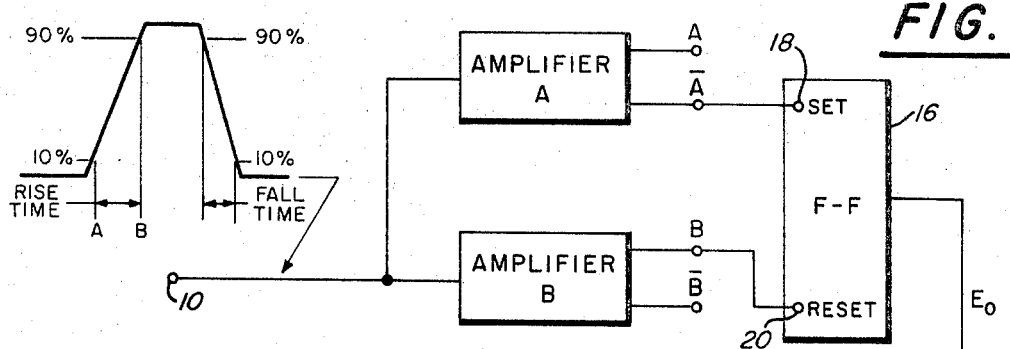
Figure 2:
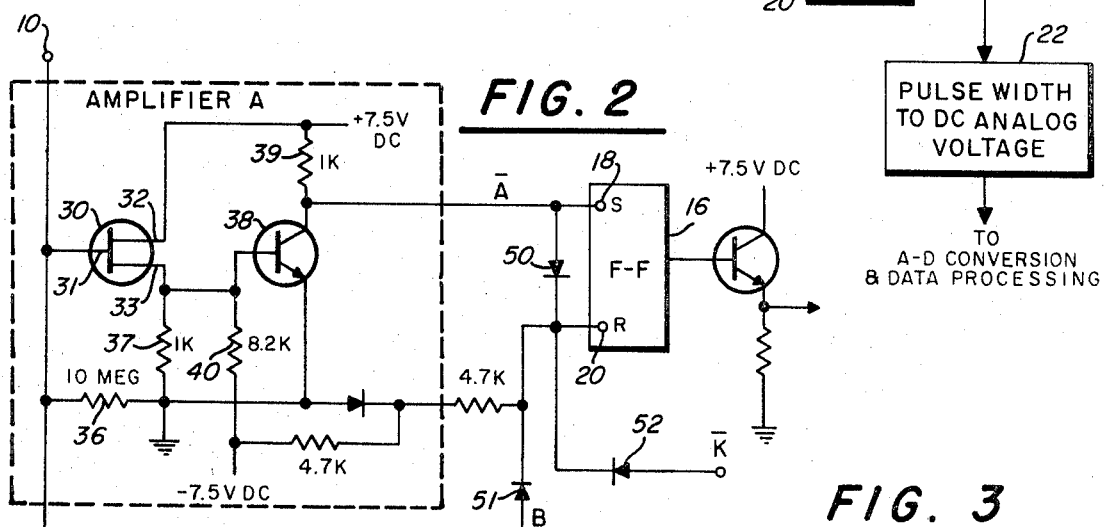
Figure 3:
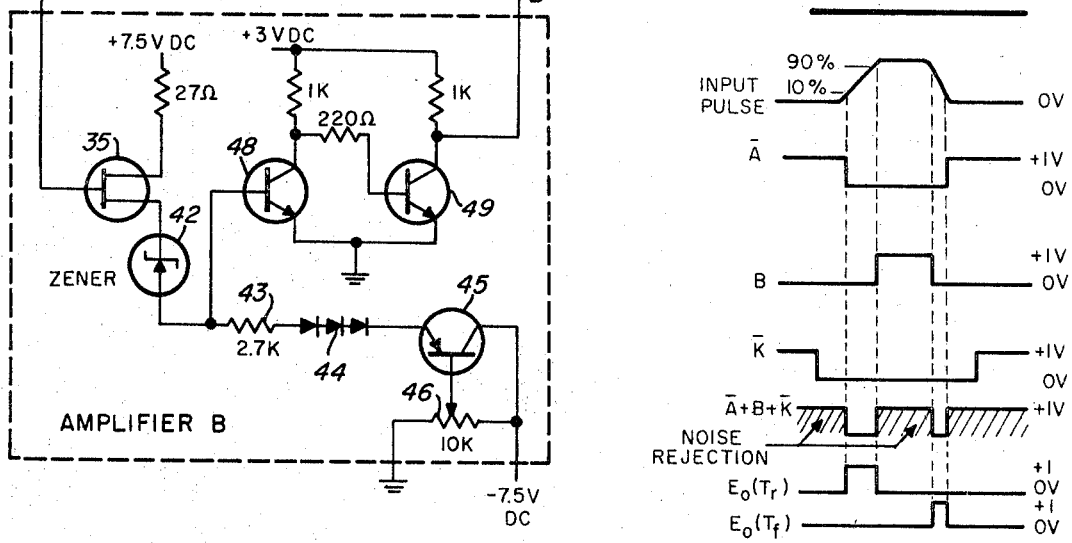
Figure 4:
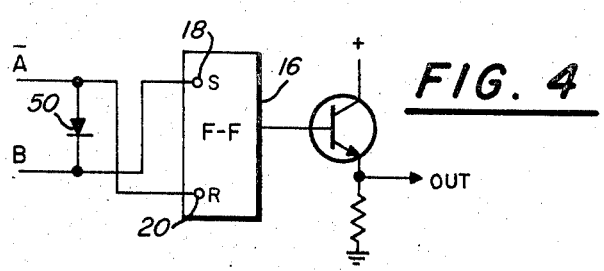

Other objects and features of this invention will become apparent to those skilled in the art by referring to the specific embodiment described in the following specification and shown in the accompanying drawing in which FIG. 1 is a block diagram of the rise time, fall time, circuits of this invention, FIG. 2 is a schematic circuit diagram of one specific circuit embodiment of the system of FIG. 1 for measuring rise time, FIG. 3 is a family of curves showing the time relationship of the pulse voltages of the circuits of FIGS. 1 and 2, and FIG. 4 shows a modification of FIG. 2 for measuring fall time of a wave front.

A single pulse, the slopes of the faces of which are to be measured, is applied to the input terminal 10 and is paralleled to the inputs of amplifier A and amplifier B. The input pulse is preferably clipped or otherwise normalized in amplitude and is exemplified in FIG. 1. In the quiescent state, the output of amplifier B is zero, while the output of amplifier A is a logical one. But, the bias voltages of the amplifier are so chosen that one produces a sharp change or trigger voltage at one value of input signal voltage while the other amplifier is biased to produce a sharp change or trigger voltage at another higher input voltage. While 10% and 90% respectively of the maximum pulse amplitude has been chosen for illustration, the range and placement of the voltages are subject to choice. The output trigger voltages A and B of amplifiers A and B are, respectively, applied to the set terminal 18 and to the reset terminal 20 of flip-flop 16. The duration of the output pulse $E_0$ is a measure of the time required for the input voltages to rise from the 10% value to the 90% value.

While many methods may be employed for measuring the duration of the output pulse $E_0$, it is referred in one application to convert the pulse width to a DC analog voltage in device 22. This DC voltage may, if desired, be converted to an analagous frequency which can be transmitted to a remote monitoring point. Techniques of A-to-D conversion are not claimed.

The specific implementation of the circuits of this invention, shown in FIG. 2, have been particularly successful in operation. To not load the test point, it is desirable to use the field effect transistor 30 with base electrode 31, drain electrode 32, and source electrode 33. The impedance of the input circuit 31–33 of the field effect transistor is nearly infinite. A like field effect transistor 35 is placed at the input end of the amplifier B. In this case, the input is grounded through the 10 meghom resistor 36 and the upper end of load resistor 37 is connected directly to the base of the transistor 38. Transistor 38 is preferably of the NPN type with the coupling or load resistor 39 connected between the positive voltage terminal and the collector. The negative terminal of the voltage source is connected to the base through the bias resistor 40. With the phase inversion of the signal in stage 38, input signal A comes $\bar{A}$ at the output terminal of the amplifier. The resistance values may be adjusted, for the particular amplifiers chosen, to provide a reliable turn on of the amplifier when the input voltage rises, say, 10% of the expected maximum signal voltage. This value is a matter of choice and is not critical.

The input stage of amplifier B is likewise a field effective transistor (35) with the source electrode coupled through the Zener diode 42, resistor 43, two or more diodes 44 and the emitter to collector path of transistor 45 to the negative terminal of the voltage source. Transistor 45, with potentiometer 46, provide convenient means for controlling the direct current bias and the level of the incoming pulse voltage for operating transistor 48. Zener diode 42 provides direct current level changing with minimum attenuation of the input pulse. By proper adjustment of potentiometer 46, transistor 48, and direct connected transistor 49, will turn on at 90% of the expected maximum input level. The resistance of diodes 44 are a function of temperature and can be easily selected in type and in number to provide almost exact compensation of the changing resistance in transistor 35 to produce an output substantially independent of temperature. In a temperature range from 30° to 125° C. it has been found that without the stabilizing diodes 44, the pulse width measurement could vary from 50 to 90 nonoseconds.

Other pulses $\overline{A}$ and B are applied, respectively, to the set and reset terminals of the flip-flop 16. According to a further feature of this invention, and to provide as great a noise rejection as possible, the reset pulse B is Or-gated through diode 51 with two additional control pulses. One of the additional control pulses is the set pulse $\overline{A}$ connected through diode 50 to the reset terminal. This signal is normally at the plus 1 volt signal and will hold the flip-flop in the reset condition until the time of measurement. The second additional noise rejection input is the $\overline{K}$ input gate control pulse, applied through diode 52. This $\overline{K}$ signal is normally of the plus one volt level except during the input pulse gate selection time, and is generated by circuits, not shown, for removing the pulse to be tested from a series of pulse.

Timing relationships of the various control voltages are shown in FIG. 3. When the input voltage rises to the assumed 10% of the pulse amplitude the trigger voltage $\overline{A}$ suddenly appears as a logical zero voltage which sets the flip-flop 16. Only when the B voltage is produced by, say, 90% of the pulse voltage will the flip-flop reset. With the $\overline{K}$ voltage applied to the Or-gate, noise is effectively eliminated from the flip-flop inputs.

To measure pulse fall time, the set pulse $\overline{A}$ is applied to the reset terminal 20, while B lead is changed over to the set terminal 18 as shown in FIG. 4. The flip-flop will now set when the voltage of the trailing edge of the test pulse drops to the 90% amplitude level and will reset when the voltage reaches the 10% level. The flip-flop "on time," $E_0$, will have a duration proportional to the input voltage fall time.

The specific biasing potentials applied to the particular amplifiers employed may be widely varied without departing from the scope of the invention. The threshold values of 10% and 90% of the signal necessary to produce an output voltage $\overline{A}$ or B were obtained with the specific resistance values shown in FIG. 2 when the transistors 31 and 35 were of the commercially obtainable types 2N3631 and 2N3066, respectively. Transistors 38, 48, and 49 were each 2N709's, while transistor 45 was a 2N862. Obviously other transistor types and appropriate bias changes could be employed, particularly if different threshold values were desired.

What is claimed is:

1. In combination in a system for measuring rise time of a signal voltage wave front, said system comprising
   a signal input terminal,
   a first and a second amplifier with input circuits connected in parallel to said signal input terminal,
   a bistable flip-flop with set and reset control circuits connected, respectively, to the output circuits of said first and second amplifiers,
   a pulse width measuring means coupled to the output of said flip-flop,
   and two threshold control means coupled, respectively, in said first and second amplifiers for producing, successively, set and reset voltages in the output circuits of said amplifiers as the voltage of said wave front attains two different voltage levels so that the duration of the flip-flop output pulse as determined by said pulse width measuring means is a function of the time interval between said set and reset voltages.

2. In the measuring system defined in claim 1, said threshold control means each comprising
   a transistor amplifier,
   means for applying bias voltages to the electrodes of each transistor amplifier for establishing predetermined voltage threshold above which the incoming signal must rise to produce an output signal.

3. The measuring system defined in claim 1 further comprising
   a timing pulse source for generating a gate pulse spanning the period of the wave front to be measured,
   an Or-gate with the output of the gate connected to said reset control circuit of said flip-flop,
   said Or-gate comprising diodes connected, respectively, to the output circuits of said first and second amplifiers and to said timing pulse source and so polarized as to reject noise actuation of said flip-flop.

References Cited

UNITED STATES PATENTS 3,259,761 7/1966 Narud et al. _____ 307—214
3,260,854 7/1966 Krishnaswamy _____ 307—247

DONALD FORRER, Primary Examiner

B. P. DAVIS, Assistan Examiner

U.S. Cl. X.R.
307—247, 263, 265; 328—114, 135